United States Patent
Li et al.

(10) Patent No.: US 9,716,294 B2
(45) Date of Patent: Jul. 25, 2017

(54) BATTERY CONTROLLER WITH MONITORING LOGIC FOR MODEL-BASED BATTERY CONTROL

(75) Inventors: Yonghua Li, Ann Arbor, MI (US); Richard Dyche Anderson, Plymouth, MI (US); Anthony Mark Phillips, Northville, MI (US); Xu Wang, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1251 days.

(21) Appl. No.: 13/451,879

(22) Filed: Apr. 20, 2012

(65) Prior Publication Data

US 2013/0278223 A1    Oct. 24, 2013

(51) Int. Cl.
| | |
|---|---|
| *H02J 7/00* | (2006.01) |
| *H01M 10/48* | (2006.01) |
| *H01M 10/42* | (2006.01) |

(52) U.S. Cl.
CPC ........... *H01M 10/48* (2013.01); *H02J 7/0004* (2013.01); *H02J 7/0008* (2013.01); *H01M 2010/4271* (2013.01)

(58) Field of Classification Search
USPC ........................................................ 320/136
See application file for complete search history.

(56) References Cited

U.S. PATENT DOCUMENTS

| | | | | |
|---|---|---|---|---|
| 6,534,954 | B1 * | 3/2003 | Plett ............................... | 320/132 |
| 2005/0077867 | A1 * | 4/2005 | Cawthorne et al. .......... | 320/104 |
| 2006/0022642 | A1 * | 2/2006 | McGee et al. ................ | 320/132 |
| 2006/0022643 | A1 | 2/2006 | Brost et al. | |
| 2009/0123813 | A1 | 5/2009 | Chiang et al. | |
| 2010/0138178 | A1 | 6/2010 | Paryani et al. | |
| 2010/0266875 | A1 * | 10/2010 | Somogye et al. ................ | 429/7 |
| 2011/0037317 | A1 | 2/2011 | Kuschnarew et al. | |
| 2012/0098481 | A1 * | 4/2012 | Hunter et al. ................ | 320/106 |
| 2012/0173081 | A1 * | 7/2012 | Hsu et al. ........................ | 701/42 |

FOREIGN PATENT DOCUMENTS

| | | |
|---|---|---|
| CN | 101311342 A | 11/2008 |
| WO | 2006057468 A1 | 6/2006 |

OTHER PUBLICATIONS

Vasebi, et al., A novel combined battery model for state-of-charge estimation in lead-acid batteries based on extended Kalman filter for hybrid electric vehicle applications, Science Direct, Journal of Power Sources, Apr. 2007.
Haitao, et al., Model-based power control strategy development of a fuel cell hybrid vehicle, Science Direct, Journal of Power Sources, Feb. 2008.
Chinese Patent Office, First Office Action for the corresponding Chinese Patent Application No. 201310134147.5 dated Apr. 5, 2016.

\* cited by examiner

*Primary Examiner* — Bryce Aisaka
(74) *Attorney, Agent, or Firm* — David B. Kelley; Brooks Kushman P.C.

(57) ABSTRACT

A battery controller with monitoring logic for a model-based battery control of a battery performs battery current characterizing, parameter and state variable abnormality detection, and bound checking of error signals between measured and predicted output variables to generate an output. Switching between closed-loop operation (i.e., the model-based battery control) and open-loop operation (i.e., a traditional battery control) is done based on the output of the monitoring logic such that closed-loop stability and performance are reasonably guaranteed.

11 Claims, 5 Drawing Sheets

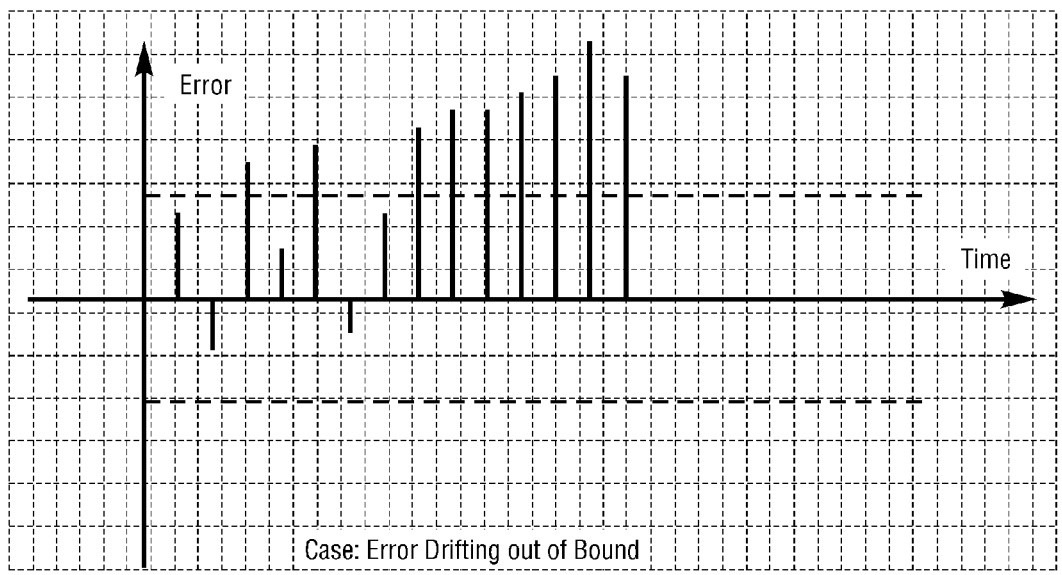
Fig. 5 — Case: Error Drifting out of Bound
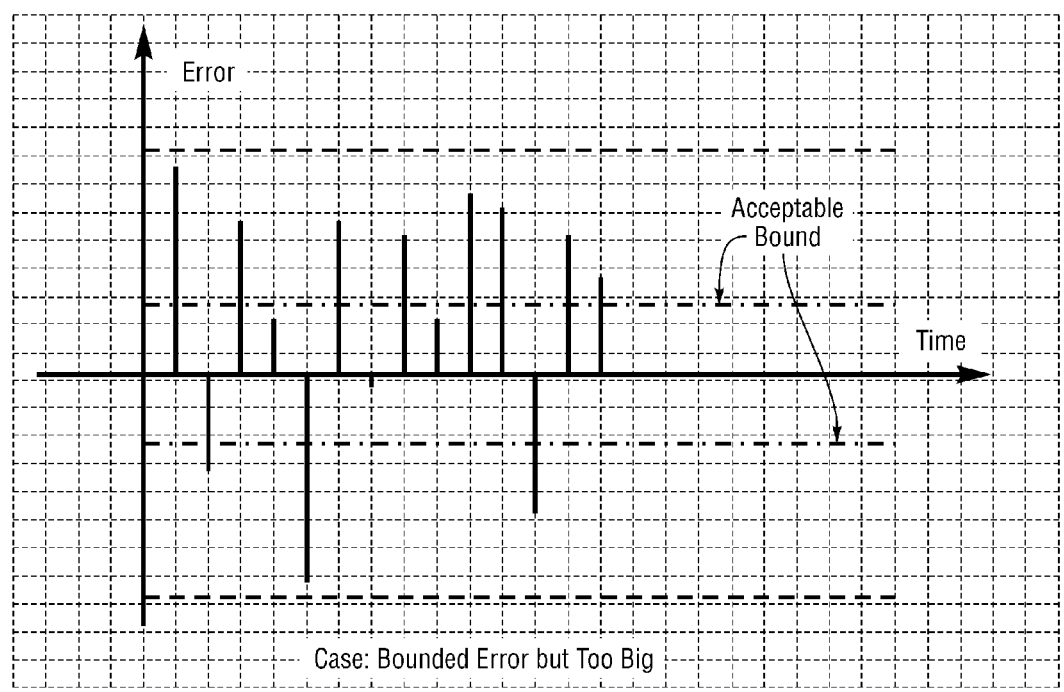
Fig. 6 — Case: Bounded Error but Too Big (Acceptable Bound)

BATTERY CONTROLLER WITH MONITORING LOGIC FOR MODEL-BASED BATTERY CONTROL

TECHNICAL FIELD

The present invention relates to model-based battery control systems.

BACKGROUND

An approach of battery control has focused on model-based state of charge estimation, power capability calculation, battery health management (power and capacity fade) as well as cell balancing. Model-based battery controls (state of charge, state of health, and state of power (power capability)) refer to closed-loop systems which use prediction/correction type algorithms in parameter and/or state estimation. In prediction/correction type algorithms, an internal model for the battery is used to first predict the state variables and then predict the outputs. The predicted outputs are compared with the real, measured outputs. The resultant projection errors are used to compensate for predicted state variables to obtain a final state estimation. This approach may be used in recursive parameter identification, state observation, among others.

Questions such as the following should be answered before a model-based battery control can be used with confidence: Is the closed loop system reasonably guaranteed to be stable? What actions should be taken if the closed loop system becomes unstable? Is the performance of the closed loop system reasonably guaranteed to be good? What actions should be taken if the closed loop system does not perform properly?

SUMMARY

Embodiments of the present invention are directed to a battery controller with monitoring logic for a model-based battery control of a battery. The monitoring logic performs battery current characterizing, parameter and state variable abnormality detection, and bound checking of error signals between measured and predicted output variables to generate an output. Switching between closed-loop operation (i.e., the model-based battery control) and open-loop operation (i.e., a traditional battery control) is done based on the output of the monitoring logic such that closed-loop stability is reasonably guaranteed. An overall battery control output is generated based on the selected operation. For instance, the overall battery control output is generated based on the model-based battery control when the model-based battery control is selected. Conversely, the overall battery control output is generated based on the traditional battery control when the traditional battery control is selected. Further, re-initialization is activated when the projection error signal falls within a specified range. As such, the monitoring logic is configured to not only address the closed-loop stability but also the performance monitoring issues of the model-based battery control.

An embodiment of the present invention provides a method which includes monitoring for whether use of a closed-loop operation for controlling a battery meets criteria. The method further includes using an open-loop operation in lieu of the closed-loop operation to control the battery while use of the closed-loop operation does not meet the criteria.

Another embodiment of the present invention provides a system having a battery controller. The controller includes a low-level estimator and a high-level supervisor. The estimator is configured to use a closed-loop operation and an open-loop operation for controlling a battery. The supervisor is configured to monitor for whether use of the closed-loop operation meets criteria and to use the open-loop operation in lieu of the closed-loop operation to control the battery while use of the closed-loop operation does not meet the criteria.

BRIEF DESCRIPTION OF THE DRAWINGS

FIG. 5 illustrates a plot of the estimation error over time for the case where the error drifts out of bounds;

FIG. 6 illustrates a plot of the estimation error over time for the case where the error is bounded but outside an acceptable range.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
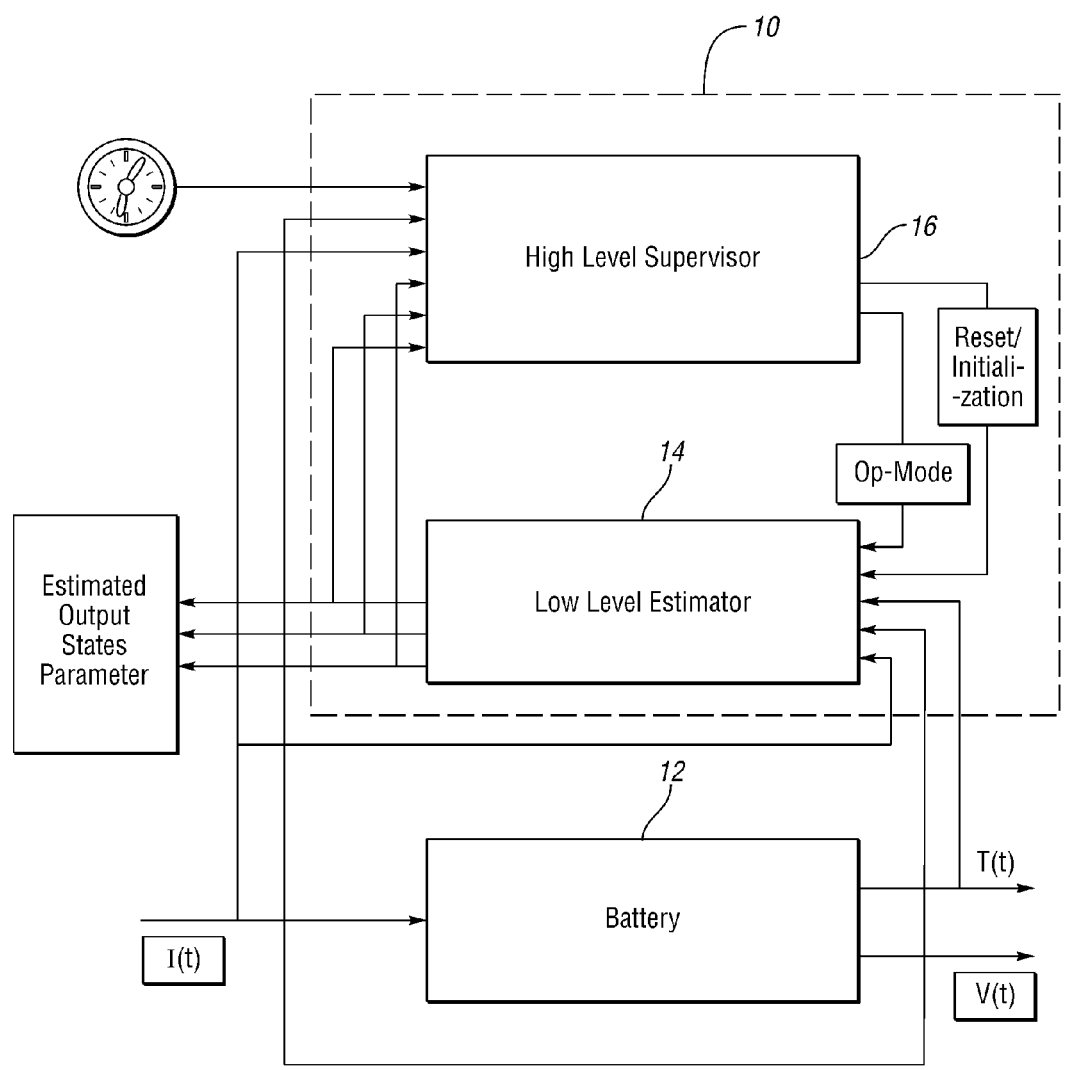
FIG. 1 illustrates a block diagram of a battery controller with monitoring logic for a model-based battery control of a battery in accordance with an embodiment of the present invention.

Referring now to FIG. 1, a block diagram of a battery controller 10 with monitoring logic for a model-based battery control of a battery 12 in accordance with an embodiment of the present invention is shown. Battery 12 may be part of a vehicle such as a hybrid electric vehicle. The block diagram of FIG. 1 illustrates how the monitoring logic of controller 10 serves as a supervisor to an existing model-based battery control module. In general, controller 10 enables use of the model-based battery control with reasonably guaranteed stability and performance. Switching between the model-based battery control (i.e., closed-loop operation) and a traditional battery control (i.e., open-loop operation) is done based on the output of the monitoring logic of controller 10. More advanced battery controls may be able to be built while being assured of stable operation with reasonably guaranteed performance by adopting the control process provided by the monitoring logic of controller 10.

The control process of controller 10 is based on hierarchical control architecture. To this end, controller 10 includes a low level estimator 14 and a high level supervisor 16. Estimator 14 operates at a faster rate compared to supervisor 16. Consequently, supervisor 16 operates at a slower rate compared to estimator 14. Inside supervisor 16, an error trend determination may use a time window that may be independent of the rate used in supervisor 16.

Low level estimator 14 is configured to perform both model-based battery controls and traditional battery controls (for example, amp-hour integration for battery state of charge (SOC) estimation). As such, estimator 14 is configured to perform both a model-based battery control (i.e., closed-loop operation) and a traditional battery control (i.e., open-loop operation) during a given time period.

High level supervisor 16 is configured to select between the model-based battery control and the traditional battery control of low level estimator 14. The overall battery control output is based on the output of the selected battery control type. For instance, when supervisor 16 selects the model-based battery control, the overall battery control output is based on the model-based battery control output generated by estimator 14. Likewise, when supervisor 16 selects the traditional battery control, the overall battery control output is based on the traditional battery control output generated by estimator 14. Supervisor 16 performs battery current characterizing, parameter and state variable abnormality detection, and bound checking of projection error signals between measured and predicted output variables (i.e., output estimation error monitoring) in order to select between the model-based and the traditional battery controls (i.e., between the closed-loop and open-loop operations of estimator 14) in generating the overall battery control output.

As indicated, the control process of controller 10 includes two computation loops: a low level, faster loop (i.e., low-level estimator 14); and a high level, slower loop (i.e., high-level supervisor 16). Estimator 14 performs (i) model-based battery control (i.e., closed-loop) calculation (e.g., SOC estimation using Kalman filter process) and (ii) traditional battery control (i.e., open-loop) calculation (e.g., amp-hour integration based SOC calculation). Supervisor 16 checks the battery current characteristics, detects parameter and state estimation limit violation, and monitors the error between the measured and predicted output values (e.g., the terminal voltage in SOC estimation). Based on the battery current characteristics, any limit violation of the parameter and state estimation, and/or the error between measured and predicted output, supervisor 16 decides whether to use the model-based calculation or the traditional calculation in generating the overall battery control output. Supervisor 16 initializes open-loop estimator variables (parameters, states) when the error between the measured and predicted outputs is within an acceptable bound such that traditional calculation can be re-started even during the middle of the drive cycle. On the other hand, supervisor 16 resets closed-loop estimator variables (parameters, states) when the error between the measured and predicted outputs is beyond a specified range.

As described, the functions performed by supervisor 16 in order to decide between the model-based battery control (i.e., the closed-loop operation) and the traditional battery control (i.e., the open-loop operation) in generating the overall battery control output include characterizing battery current signals (I(t)), detecting abnormalities in parameter and state variable estimation, and monitoring error signals between measured and predicted output variables.

In regards to battery current signal characterizing, currents are characterized as patterns and supervisor 16 decides whether or not to use the model-based battery control based on recognition of the patterns. The following cases may be considered: current signal is small, or is stationary with low signal-to-noise (SNR) ratio during battery operation; and current signal is extremely volatile, for example, based on its value of derivative with respect to time.

In regards to detecting abnormalities in parameter and state variable estimation (i.e., detecting parameter and state variable limit violation), supervisor 16 uses information on whether the parameter and state variables hit pre-set limits to decide whether or not to use the model-based battery control and to reset the learning process. An indicator on whether the model-based battery control is operating abnormally is whether to be learned parameters/estimated state variables fall outside a pre-defined range. The pre-defined range is determined such that all possible ranges of the given parameter during battery operating life are covered based on an understanding of the intrinsic properties of battery 12. For example, the open circuit voltage of a lithium-ion cell will never be greater than approximately 4.2V. This maximum value varies depending on details of the cell chemistry. If this occurs, then there is reason to believe that the parameter learning algorithm and/or state estimation algorithm may have diverged. When this happens, open-loop calculation (i.e., the traditional battery control) should be used and a reset or similar action is needed for closed-loop control. The reset involves parameter and voltage initialization, where last stored parameters are used to replace the parameter values and voltage can be set to values based on open-loop estimation, stored parameters and battery measurements.

In regards to monitoring error signals between measured and predicted output variables, supervisor 16 uses error signals between measured and predicted outputs to decide whether the estimation process has converged. Supervisor 16 then accordingly decides whether or not to use the closed-loop operation, under conditions that the input (current) is deemed rich enough (i.e., non-stationary, or signal to noise ratio is not too small). Such error signals provide a significant way of indicating whether model-based battery control is working properly. The following three cases are identified and related supervisory monitoring control actions are designed for supervisor 16. First, an error signal bounded within a specified value means that the model-based battery control is working properly and therefore closed-loop operation should be used. In particular, if the error signal falls within a smaller bound, then initialization-on-the-fly can be performed. Second, an error signal drifting out of bound means that the model-based battery control is not working properly and therefore open-loop operation should be used. Third, an error signal bounded but out of a specified value means that the model-based battery control is not working properly and therefore open-loop operation should be used. These are all calibration dependent.

As indicated, another function of supervisor 16 includes (re-) initialization on-the-fly process. This process involves re-initializing the open-loop SOC calculation and storing parameters which will be used to reset (when closed-loop is abnormal, etc.). In particular, the initial value is updated based on a determination that the estimation process converges to a satisfactory level. There is no cumulative error in terms of resetting initial values. This is in contrast to traditional battery controls where initialization has to be done when the vehicle is restarted after a sufficiently long key-off event.

As described, battery controller 10 with monitoring logic for model-based battery controls is based on battery current characterizing, parameter and state variable abnormality detection, and bound checking of error signals between measured and predicted output variables. Such a monitoring logic is desired for the following reasons. First, the model adopted for model-based battery control may not be representative of the real battery behavior for all kinds of current and temperature. Hence, there are times when the parameter and/or state estimations may not converge at all. Second, the parameter and/or state estimation algorithms have transient response periods (for example, start-up or rapid current swings during vehicle maneuvering). The performance of these algorithms during transient response periods may not be acceptable. Third, like any other adaptive control and observation algorithm, the closed-loop system may not even be stable. Although a theoretic approach can be taken, given an incomplete understanding of the behavior of battery 12, it is not likely that a conclusion as to whether the closed-loop system will remain stable can be reached based on purely mathematical analysis.

Figure 2:
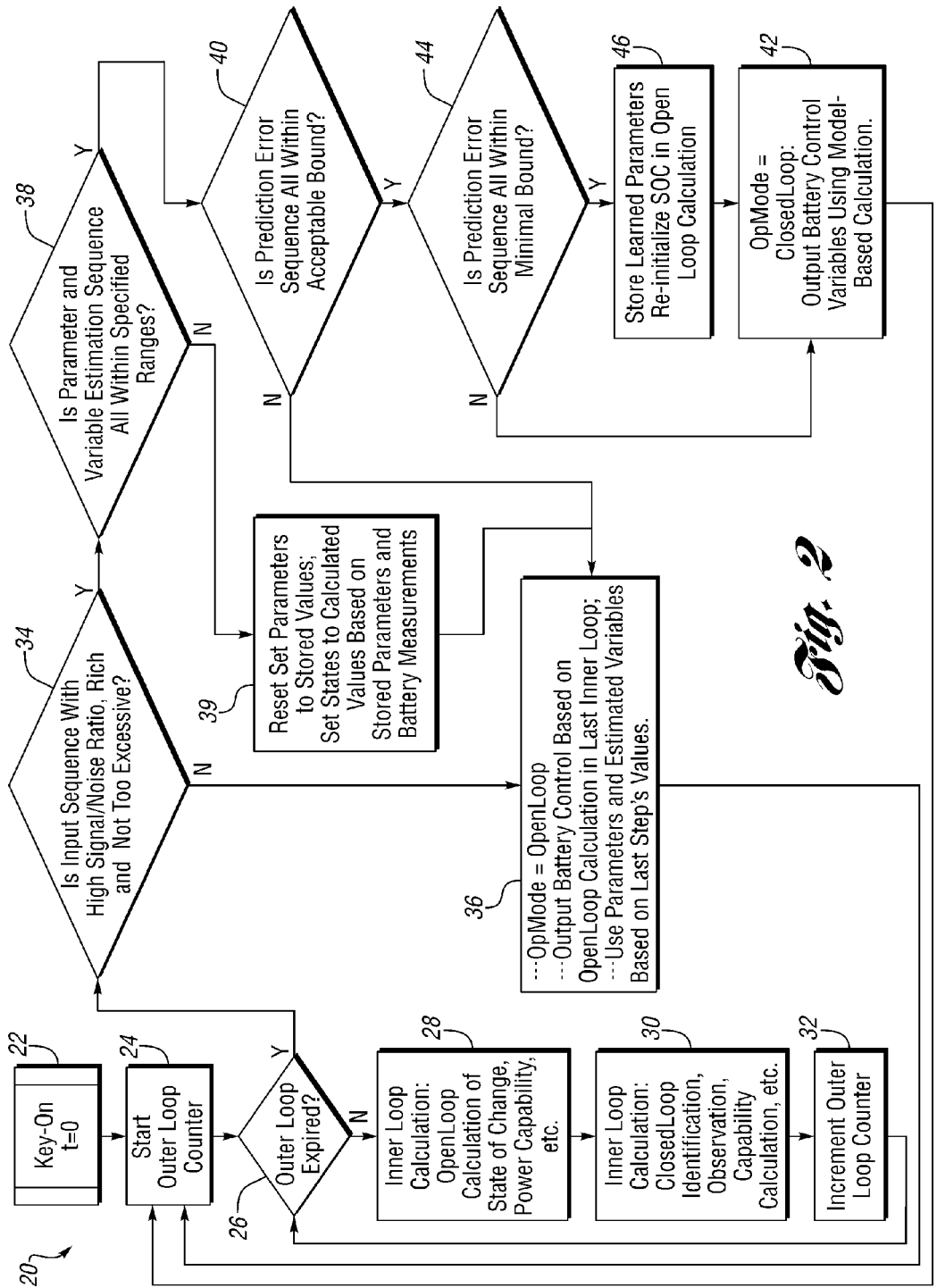
FIG. 2 illustrates a flow diagram illustrating operation of the controller in accordance with an embodiment of the present invention.

Referring now to FIG. 2, with continual reference to FIG. 1, a flowchart 20 describing operation of controller 10 in accordance with an embodiment of the present invention is shown. Again, the operation of controller 10 includes an inner loop process handled by low-level estimator 14 and an outer loop process handled by high-level supervisor 16. In the inner loop process, estimator 14 performs a traditional (i.e., open-loop) calculation (block 28 in FIG. 2) and a model-based (i.e., closed-loop) calculation (block 30 in FIG. 2). The inner loop process is repeated a number of times. Each iterative involves estimator 14 performing another traditional calculation and another model-based calculation.

In the outer loop process, supervisor 16 checks battery current characteristics (decision block 34 in FIG. 2), detects parameter and state estimation limit violation (decision block 38 in FIG. 2), and monitors the error between the measured and predicted output values (decision block 40 in FIG. 2) to decide whether to use the open-loop, traditional battery control or the closed-loop, model-based battery control in generating the overall battery control output. Further in the outer loop process, supervisor 16 may reset the learning process, or re-initialize the open-loop SOC calculation and storing parameters, depending on the error between the measured and predicted outputs.

The operation of controller 10 begins with key-on at time t=0 as shown in block 22. A counter for the outer loop process is then started as shown in block 24. While the outer loop counter has not yet expired pursuant to decision block 26, estimator 14 performs the functions of the inner loop process. In particular, estimator 14 performs a traditional, open-loop calculation as shown in block 28 and a model-based, closed-loop calculation as shown in block 30. After estimator 14 performs the traditional and model-based calculations, the counter for the outer loop process is incremented as shown in block 32. The inner loop process repeats with estimator 14 performing the traditional and model-based calculations and the counter for the outer loop process being incremented each time as described. The inner loop process repeats until the outer loop counter expires pursuant to decision block 26.

Once the outer loop counter expires, the operation of controller 10 changes from the inner loop process to the outer loop process. During the outer loop process, supervisor 16 selects either the traditional, open-loop battery control or the model-based, closed-loop battery control to be used to generate the overall battery control output. For instance, if supervisor 16 selects the traditional battery control, then the traditional battery control calculation of estimator 14 (block 28) at the end of the inner loop process is used to generate the overall battery control output. That is, in this case, the overall battery control output is based on the traditional battery control calculation (i.e., the open-loop calculation). Likewise, if supervisor 16 selects the model-based battery control, then the model-based battery control calculation of estimator 14 (block 30) at the end of the inner loop process is used to generate the overall battery control output. That is, in this case, the overall battery control output is based on the model-based battery control calculation (i.e., the closed-loop calculation).

Supervisor 16 selects between the traditional battery control and the model-based battery control based on the battery current and the output of estimator 14 at the end of the inner loop process. More particularly, as described above, supervisor 16 selects between the traditional and model-based battery controls based on the battery current, abnormalities in parameter and state variable estimation, and error signals between measured and predicted output variables. To this end, supervisor 16 initially decides in decision block 34 whether to use the traditional battery control or the model-based battery control based on the characteristics of the battery current. For example, supervisor 16 selects the traditional battery control calculation of estimator 14 to be used in generating the overall battery control output as shown in block 36 if the battery current lacks a sufficient SNR ratio or is too excessive as shown in decision block 34.

Otherwise, the outer loop process continues with supervisor 16 deciding in decision block 38 whether to use the traditional battery control or the model-based battery control based on internally calculated parameters and state variables of the output of estimator 14. For example, supervisor 16 selects the traditional battery control calculation of estimator 14 to be used in generating the overall battery control output as shown in block 36 if the parameter and variable estimation sequence are not within the specified ranges as shown in decision block 38.

Otherwise, the outer loop process continues with supervisor 16 deciding in decision block 40 whether to use the traditional battery control or the model-based battery control based on the error sequence between the actual and estimated outputs of estimator 14. For example, supervisor 16 selects the traditional battery control calculation of estimator 14 to be used in generating the overall battery control output as shown in block 36 if the predicted error sequence is not within an acceptable bound as shown in decision block 40.

Otherwise, the outer loop process continues with supervisor 16 selecting the model-based control calculation of estimator 14 to be used in generating the overall battery control output as shown in block 42. Initially, supervisor 16 decides in decision block 44 whether re-initialization process should be executed. For example, supervisor 16 selects execution of the re-initialization process as shown in block 46 when the predicted error sequence is all within a minimal bound as shown in decision block 44. Execution of the re-initialization process includes supervisor 16 resetting system initialization values (resetting SOC value for open loop calculation, and storing learned parameters) as shown in block 46. In turn, supervisor 16 selects the model-based control calculation of estimator 14 to be used in generating the overall battery control output as shown in block 42. If supervisor 16 does not execute the re-initialization process, such as when the predicted error sequence is not all within the minimal bound as shown in decision block 44, then supervisor selects the model-based control calculation of estimator 14 to be used in generating the overall battery control output as shown in block 42 without re-initializing the system.

As described, once supervisor 16 selects between the traditional battery control and the model-based battery control, the corresponding battery control calculation of estimator 14 is used in generating the overall battery control output. For example, the traditional battery control calculation of estimator 14 is used to generate the overall battery control output as shown in block 36 in response to supervisor 16 selecting the traditional battery control over the model-based battery control. Conversely, the model-based battery control calculation of estimator 14 is used to generate the overall battery control output as shown in block 42 in response to supervisor 16 selecting the model-based battery control over the traditional battery control. In either event, operation of controller 10 continues from the generation of the overall battery control output pursuant to blocks 36 and 42 and repeats with the operation of controller 10 staring anew at block 24.

Figure 3:
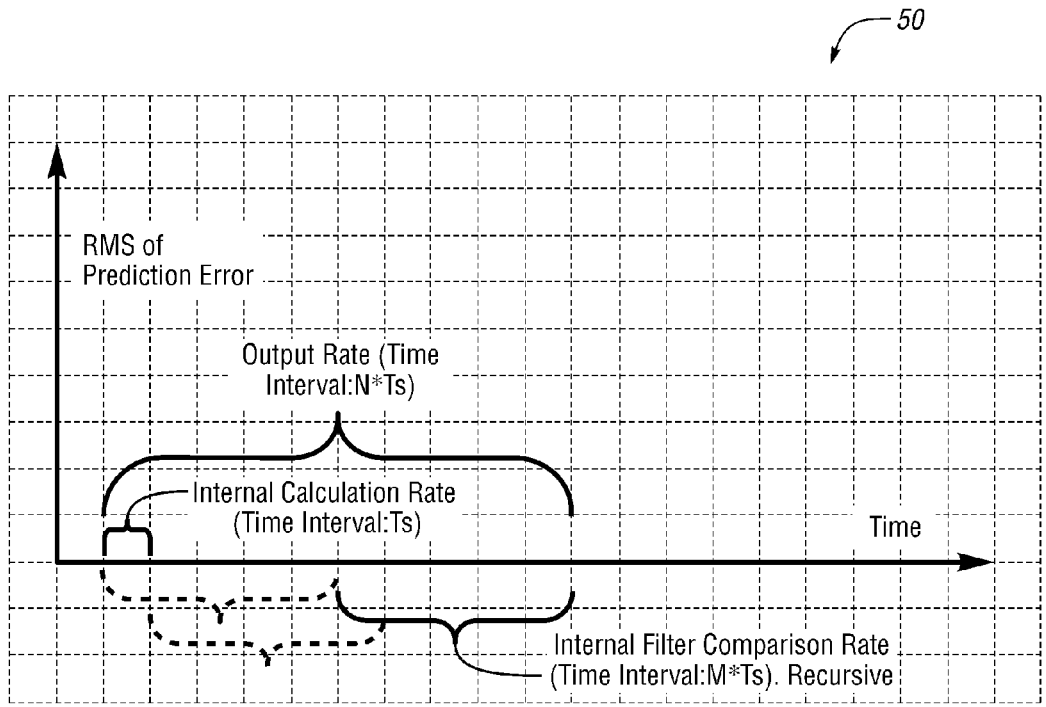
FIG. 3 illustrates a plot of the step rate of the estimator of the controller and the output rate of the supervisor of the controller in accordance with an embodiment of the present invention.

As noted, estimator 14 operates at a faster rate than supervisor 16 as estimator 14 performs multiple iterations of the inner loop process whereas supervisor 16 performs a single duration of the outer loop process during a given cycle of the overall operation of controller 10. With reference to FIG. 3, a plot 50 of the step rate of the estimator 14 and the output rate of supervisor 16 is shown. Plot 50 is intended to show how the two rates are determined. The internal calculation (i.e., the inner loop process) performs parameter estimation, SOC estimation, etc., based on the model-based battery control algorithms with a faster rate. The open-loop calculation is proceeding in parallel. After N steps or iterations of the internal calculation, an output step (i.e., the outer loop process) is performed. In the output step, the battery current, the internally calculated parameters and state variables (for example, SOC), and the error sequence between measured and estimated outputs are analyzed. Based on the analysis, a decision is made as to whether to provide demanded output (i.e., the overall battery control output) based on the model-based calculation or the traditional calculation. Further, in the output step, reset or re-initialization processes can be executed if it is determined that it is appropriate to do so.

Each of the functions performed by supervisor 16 (i.e., the battery current characterizing, the parameter and state variable estimation abnormality detection, and the analysis of error signals between measured and predicted output variables) to decide between the model-based battery control and the traditional battery control in generating the overall battery control output will now be described in further detail.

Supervisor 16 decides from the battery current whether to use the open-loop operation or the closed-loop operation as the model has certain limits as to where it fits (i.e., if un-modeled dynamics are significant). Exemplary cases are where no battery current is used, the battery current is constant, or the battery current has a low SNR ratio during battery operation. From key-off to key-on, or during battery operation, there may be substantial ambient temperature change. Thus, the battery equivalent circuit model parameters will change substantially as well. Most model-based control algorithms depend on the assumption that initial values of parameters and states are well within the vicinity of parameters and states. Of particular interest is the period of time when the battery is used relatively lightly. In this case, the sensor measurement noise remains flat no matter what is the measured quantity. Hence, using the sensor reading when the SNR ratio is deemed too small should be avoided. To this end, a period of time is classified as no current used if the corresponding root-mean-square (RMS) current value is below a given threshold. In other words, if the battery current does not have a high enough SNR ratio, then the model-based battery control should not be used. Another interesting situation is when the battery current is too flat and remains relatively constant (i.e., stationary). In this case, the parameter identification algorithm will not be able to trace changes in parameters (a situation, commonly known as a lack of "persistence excitation"). Therefore, the model-based battery control should not be used.

Another exemplary case involves the battery current having extreme volatile characteristics. In this case, the current may be too rich (i.e., in terms of derivative (with respect to time), for example a sufficient large step input) or too big (i.e., in terms of absolute amplitude). Such a battery current is called "excessive" herein. A reason to identify excessive battery current is to make sure un-modeled dynamics and/or nonlinearity is not excited. Indeed, should the model mismatch with the battery (as likely will be the case for most modeling algorithms), it will be difficult for the parameter identification algorithm to find suitable parameters of the model to fit into the real plant dynamics (model plus the un-modeled dynamics). To this end, it is better to use the open-loop calculation instead.

The parameter and state variable abnormality detection will now be discussed. While different algorithms work in different ways, by commonly referring to them as prediction/correction algorithms, it is possible to identify symptoms when such model-based battery control has failed. One indicator on whether model-based battery control is operating abnormally is that the to be learned parameters/estimated state variables fall outside a pre-defined range that is determined to cover all possible ranges of the given parameter based on understanding of the intrinsic properties of battery 12. For example, the open circuit voltage of a lithium-ion cell will never be greater than approximately 4.2V. If this occurs, then there is reason to believe that the parameter learning algorithm and/or state estimation algorithm may have diverged. When this happens, the open-loop calculation should be used in generating the overall battery control output and a reset or similar action is needed.

The monitoring of error signals between measured and predicted output variables will now be discussed. As shown in FIG. 2, this operation will not be executed if the determination of block 34 is false. Hence, the discussion for this operation is based on the assumption that the current characteristics determination in block 34 is true. Herein, it is interesting to know when the estimated values are considered accurate enough that they can be used to replace the last stored parameter values. Here is how the parameter/state estimation convergence can be monitored. First, as shown in FIG. 3, memorize the past M samples (of internal calculation) of observation errors in predicted output vs. measured output. M can be larger or smaller than N. Next, decide if the error sequence is converging. Let error $(i)=Y(i)-Y\_estimated(i)$, where $Y(i)$ is the measured output variable (or vector of variables), and $Y\_estimated(i)$ is the predicted output variable (or vector of variables), and i is time index.

Figure 4:
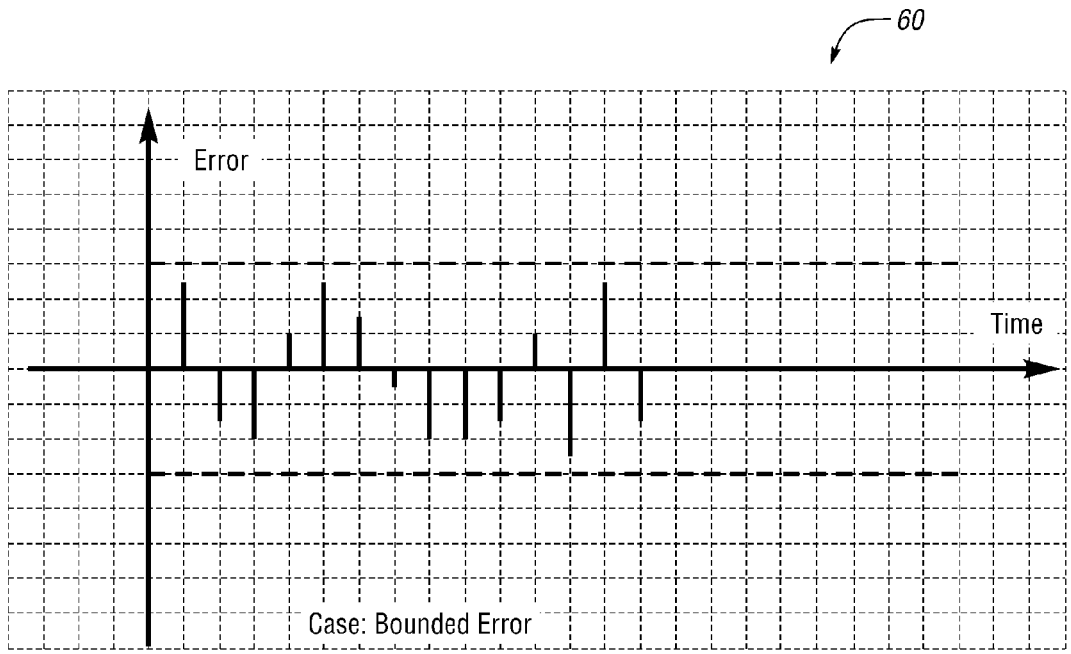
FIG. 4 illustrates a plot of the estimation error over time for the case where the error is bounded within a specified value.

FIG. 4 is a plot 60 of the estimation error over time for the case where the error is bounded within a specified value $(abs(error(i)) < E\_max$, for all i). FIG. 5 is a plot 70 of the estimation error over time for the case where the error drifts out of bounds $(abs(error(i)) >= E\_max$ for all $i >= N\_cal$). FIG. 6 is a plot 80 of the estimation error over time for the case where the error is bounded but outside an acceptable range (abs(error(i))>=E_maxplus, for some i). Here, E_max, N_cal and E_maxplus are calibratable values.

The special case of the initialization on-the-fly will now be discussed. If the error sequence further satisfies of the following: abs(error(i))<E_maxminus<E_max for all i, then it is time to update the initial values used in open-loop operation and store learned parameters used in closed-loop operation. When it is determined that the above situation has occurred, it can be reasoned with confidence that both parameter and state variables can be re-initialized in the sense that those could serve as good initial values. This has significant meaning as can be understood from the following. For example, in traditional amp-hour based SOC estimation for lithium-ion batteries, the SOC is initialized after the battery has rested for sufficiently long time. During vehicle driving, there is no chance to reset the SOC. As described, controller 10 is capable of resetting the SOC (for example, SOC_init=SOC(M) for some M, block 46 in FIG. 2) whenever the learning error (prediction vs. actual) falls into the identified pattern. Another example is, if at a time after the initialization, the closed-loop estimator is deemed unstable again, the stored parameters can be used for reset process (block 39 in FIG. 2). This idea can be applied to parameter and/or state variable estimation (re-)initialization for all prediction/correction type battery controls. Here, E_maxminus is a calibratable value.

With the above discussion of the functions performed by supervisor 16 to decide between the model-based battery control and the traditional battery control in generating the overall battery control output, the operation of controller 10 is now described in further detail. When key-on, the counter is started and the operating flag is set to OPENLOOP. Supervisor 16 is started after the counter expires. Supervisor 16 then decides if the battery current characteristics are not suitable for closed-loop operation. If so, then supervisor 16 maintains the operating flag as OPENLOOP. Next, supervisor 16 decides if the parameter and state observation variables go out of bounds. If so, then supervisor 16 maintains the operating flag as OPENLOOP. Next, supervisor 16 decides if the observation error is out of bounds (either bounded but with larger than specified bounds or drifting out of bounds). If so, then supervisor 16 maintains the operating flag as OPENLOOP. Otherwise, supervisor 16 changes the operating flag to CLOSEDLOOP. In particular, if the error sequence is bounded by a smaller, specified bound, state values are updated and parameter values are stored.

Figure 7:
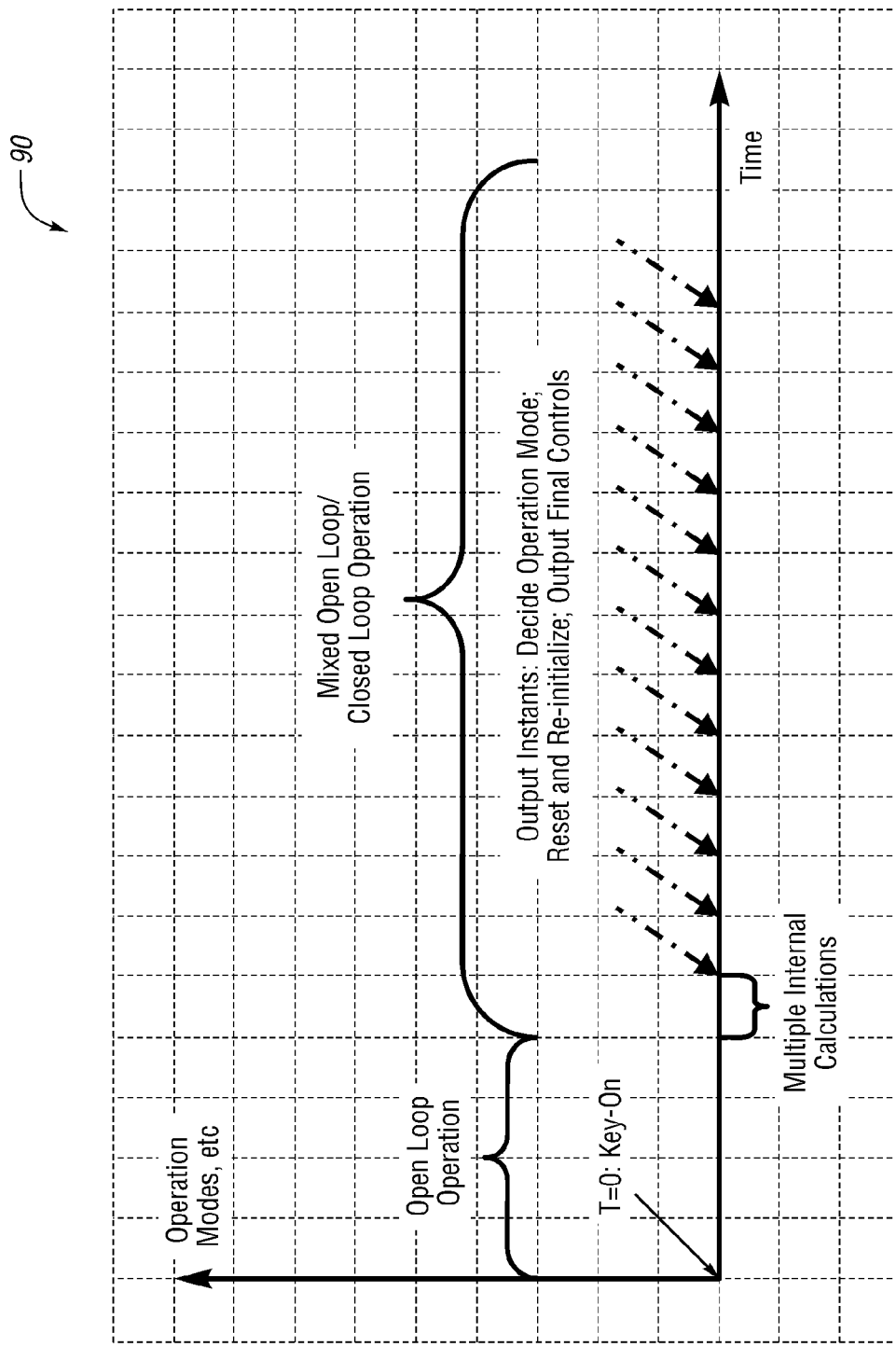
FIG. 7 illustrates a plot of the operation of the controller in accordance with an embodiment of the present invention.

As described herein, OPENLOOP means the overall battery control output is based on traditional calculation. For example, in the case of SOC estimation, amp-hour integration calculation is used in OPENLOOP. The "re-initialization" step has been included above so this is still different from amp-our integration where the initial SOC is obtained while at key-on. The CLOSEDLOOP involves the model-based battery control including parameter and/or state estimation. With reference to the above description, FIG. 7 illustrates a plot 90 of the operation of controller 10.

According to the foregoing, embodiments of the present invention provide a battery controller with monitoring logic for a model-based battery control. The monitoring logic is on top of the nominal model-based battery controls which use prediction/correction algorithms. The monitoring logic adds an additional layer of protection if the model-based calculation in its initial form becomes unstable or has an unacceptable performance. The monitoring logic also enables open-loop estimation initialization (instead of only performing at key-on) during the operation of the battery so that other proven yet less accurate operation can be used if desired.

As described, for model-based SOC estimation and other closed-loop controls, a concern is whether the resultant estimation is acceptable. The monitoring logic provides a way of monitoring the estimation process and taking an alternative approach (i.e., an open-loop control in place of the closed-loop control) when the required accuracy is not met with the closed-loop control.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method comprising:
monitoring, by a controller in communication with a battery, a battery variable;
using, by the controller, a closed-loop operation to control the battery while a difference between an estimate of the battery variable estimated from the closed-loop operation and the battery variable is within a predetermined range; and
using, by the controller, an open-loop operation to control the battery while the difference is out of the predetermined range.

2. The method of claim 1 wherein:
the battery variable is current of the battery.

3. The method of claim 1 wherein:
the predetermined range varies based on temperature of the battery.

4. The method of claim 1 further comprising:
detecting whether the difference is within a minimal bound less than a predetermined acceptable bound;
initializing the open-loop operation when the difference is within the minimal bound; and
storing learned parameters when the difference is within the minimal bound.

5. The method of claim 1 wherein:
the closed-loop operation includes a model-based battery control.

6. A system comprising:
a controller having an estimator and a supervisor;
wherein the estimator is configured to use a closed-loop operation and an open-loop operation for controlling a battery;
wherein the supervisor is configured to select the closed-loop operation while an error difference between an estimate of a battery variable estimated from the closed-loop operation and the battery variable is within a predetermined range and to select the open-loop operation to control the battery otherwise.

7. The system of claim 6 wherein:
the battery variable is current of the battery.

8. The system of claim 6 wherein:
the supervisor is further configured to detect whether the error difference is within a minimal bound less than a predetermined acceptable bound, initialize the open-loop operation when the error difference is within the minimal bound, and store learned parameters when the error difference is within the minimal bound.

9. The system of claim 6 wherein:
the closed-loop operation includes a model-based battery control.

10. A method comprising:
controlling a battery, by a controller in communication with the battery, using one of a closed-loop operation and an open-loop operation at a time; and
switching between using the closed-loop operation to control the battery while a difference between an estimate of a battery variable estimated from the closed-loop operation and the battery variable is within a predetermined range and using the open-loop operation while the difference is outside the range.

11. The method of claim 10 wherein:
the battery variable is current of the battery.

* * * * *